(12) United States Patent
Srinivasan et al.

(10) Patent No.: US 12,066,969 B2
(45) Date of Patent: Aug. 20, 2024

(54) IC WITH ADAPTIVE CHIP-TO-CHIP INTERFACE TO SUPPORT DIFFERENT CHIP-TO-CHIP

(71) Applicant: XILINX, INC., San Jose, CA (US)

(72) Inventors: Krishnan Srinivasan, San Jose, CA (US); Sagheer Ahmad, Cupertino, CA (US); Ygal Arbel, Morgan Hill, CA (US); Millind Mittal, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 221 days.

(21) Appl. No.: 17/589,633

(22) Filed: Jan. 31, 2022

(65) Prior Publication Data

US 2023/0244628 A1 Aug. 3, 2023

(51) Int. Cl.
*G06F 13/42* (2006.01)
*G06F 13/38* (2006.01)
*G06F 13/40* (2006.01)

(52) U.S. Cl.
CPC ............ *G06F 13/42* (2013.01); *G06F 13/382* (2013.01); *G06F 13/4063* (2013.01)

(58) Field of Classification Search
CPC .. G06F 13/42; G06F 13/4213; G06F 13/4217; G06F 13/4221; G06F 13/382; G06F 13/387; G06F 13/385
See application file for complete search history.

(56) References Cited

U.S. PATENT DOCUMENTS

| | | | | |
|---|---|---|---|---|
| 11,100,028 B1 * | 8/2021 | Subramaniam | ..... | G06F 13/4221 |
| 11,216,397 B2 * | 1/2022 | Tang | ................... | H01L 25/0655 |
| 11,537,543 B2 * | 12/2022 | Tummala | ............ | G06F 13/4027 |
| 2018/0102338 A1 * | 4/2018 | McLellan | ............... | H05K 3/368 |
| 2020/0226018 A1 * | 7/2020 | Das Sharma | ........... | G06F 11/10 |
| 2021/0399982 A1 * | 12/2021 | Das Sharma | ........... | H04L 49/60 |
| 2022/0102281 A1 * | 3/2022 | Subbareddy | ......... | H01L 27/0207 |
| 2023/0067771 A1 * | 3/2023 | Vanesko | ............... | G06F 9/3009 |

OTHER PUBLICATIONS

Bousdras et al, Template architectures for highly scalable, many-core Heterogeneous SoC: Could-of-Chips, IEEE International Symposium on Reconfigurable Communication Centric System-on-Chip, 2018.
Kim et al, Architecture, Chip, and Package Codesign Flow for Interposer-Based 2.5-D Chiplet Integration Enabling Heterogeneous IP Reuse, IEEE Transactions on VLSI, 2020.
Vinnakota, Bapi, et al., "The Open Domain-Specific Architecture", IEEE Micro, IEEE Service Center, Los Alamitos, CA, vol. 41, No. 1, Dec. 3, 2020, pp. 30-36.
Vinnakota, Bapiraju, "The Open Domain-Specific Architecture Next Steps to Production", Proceedings of the Eight Annural ACM International Conference on Nanoscale Computing and Communication, New York, NY, Sep. 7, 2021, pp. 1-5.

* cited by examiner

*Primary Examiner* — Raymond N Phan
(74) *Attorney, Agent, or Firm* — Patterson + Sheridan, LLP (57) ABSTRACT

Embodiments herein describe using an adaptive chip-to-chip (C2C) interface to interconnect two chips, wherein the adaptive C2C interface includes circuitry for performing multiple different C2C protocols to communicate with the other chip. One or both of the chips in the C2C connection can include the adaptive C2C interface. During boot time, the adaptive C2C interface is configured to perform one of the different C2C protocols. During runtime, the chip then uses the selected C2C protocol to communicate with the other chip in the C2C connection.

20 Claims, 7 Drawing Sheets

IC WITH ADAPTIVE CHIP-TO-CHIP INTERFACE TO SUPPORT DIFFERENT CHIP-TO-CHIP

TECHNICAL FIELD

Examples of the present disclosure generally relate to an adaptive chip-to-chip ($C_2C$) interface that can support multiple different protocols.

BACKGROUND

As technology evolves, instead of employing a single IC chip including all components and providing all functionalities, recent design methodologies are splitting the IC into one or more chiplets coupled to a common anchor IC. The chiplet comprises an IC specifically designed to be integrated with additional chiplets and an anchor IC to perform functions of a larger IC. Chipmakers may divide the larger IC into the chiplets and utilize the chiplets to perform particular functions or provide functionality to the IC when connected to the anchor. The chiplets may be hardwired to respective locations on or with respect to the anchor. This chiplet-based architecture de-couples the development cycle of the anchor IC from the chiplets, as the chiplets and anchor IC may be fabricated separately rather fabricating the entire integrated circuit on a single larger piece of silicon.

Using chiplets to build larger devices is an emerging technology. A key part of it is the chip-to-chip (C2C) interface technology, such as the one based on Joint Electron Device Engineering Council (JEDEC) high bandwidth memory (HBM3) standard. The C2C interface is optimized for short reach physical connections over a medium such as silicon interposer or equivalent.

A typical multi-chip system includes an anchor chip connected to several chiplets. The anchor often includes common blocks such as processor subsystem (PS), memory subsystem (DDR controllers), etc. The chiplets can include dedicated logic such as data processing engines or high bandwidth memory. One advantage of a chiplet based architecture is that the architecture de-couples the development cycle of the anchor from the chiplet. This allows a vendor to mix and match different versions of anchors and chiplets in a plug-n-play manner. However, this assumes that the anchor and chiplets implement the same C2C interface protocol.

SUMMARY

One embodiment describes a IC die that includes an adaptive chip-to-chip (C2C) interface including circuitry for supporting a plurality of different C2C protocols. The IC die is configured to, during boot time, configure the adaptive C2C interface to perform only one of the plurality of different C2C protocols to communicate with an external IC die. The IC die also includes processing circuitry coupled to the adaptive C2C interface and configured, during runtime, to use the adaptive C2C interface to communicate with the external IC die, wherein the IC die and the external IC die are components of a chip-to-chip configuration.

Another embodiment described herein is a system that includes a first IC die comprising a hardened C2C interface comprising circuitry for supporting only a first C2C protocol and a second IC die connected to the first IC die where one of the first and second IC dies is an anchor and the other is a chiplet. Further, the second IC die including an adaptive C2C interface comprising circuitry for supporting a plurality of different C2C protocols. The second IC die is configured to, during runtime, configure the adaptive C2C interface to perform only the first C2C protocol to communicate with the hardened C2C interface in the first IC die.

Another embodiment described herein is a system that includes a chiplet including a first adaptive C2C interface with circuitry for supporting a plurality of different C2C protocols where the chiplet is configured to, during runtime, configure the first adaptive C2C interface to perform only a first C2C protocol of the plurality of different C2C protocols. The system also includes an anchor connected to the chiplet and including a second adaptive C2C interface with circuitry for supporting the plurality of different C2C protocols. The anchor is configured to, during runtime, configure the first adaptive C2C interface to perform only the first C2C protocol to communicate with the first adaptive C2C interface in the chiplet.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe using an adaptive C2C interface to interconnect two chips (also referred to interchangeably as IC dies) (e.g., two field programmable gate arrays (FPGAs), two application specific integrated circuits (ASICs), two system on chips (SoCs), or an anchor and one or more chiplets (e.g., high bandwidth memory (HBM)). One or both of the chips in the C2C connection can include the adaptive C2C interface, which supports multiple C2C protocols. For example, the adaptive C2C interface can support using one or more standard-defined C2C protocols, such as Advanced eXtensible Interface-Streaming (AXIS) or Compute eXpress Stream (CXS), or a proprietary C2C protocol. Further, the adaptive C2C interface can support different options for a standard C2C protocol, such as supporting parity in the CXS protocol.

At boot time, the adaptive C2C interface is configured to support the same C2C protocol used by the other chip. For example, one chip may have a hardened (non-adaptive) C2C interface that supports only one protocol (e.g., AXIS) while the other chip has an adaptive C2C interface that can support AXIS, CXS, or a proprietary C2C protocol. At boot time, the chip with the adaptive C2C interface is configured such that the adaptive C2C interface performs the AXIS protocol, thereby permitting the two chips to communicate using the same protocol. In this manner, the same chip (which has an adaptive C2C interface) can be connected to different chips that have hardened C2C interfaces that use different C2C protocols. In another example, both chips can have adaptive C2C interfaces, in which case, the system designer can select which protocol to use and configure the adaptive C2C interfaces to support the selected protocol.

Figure 1A:
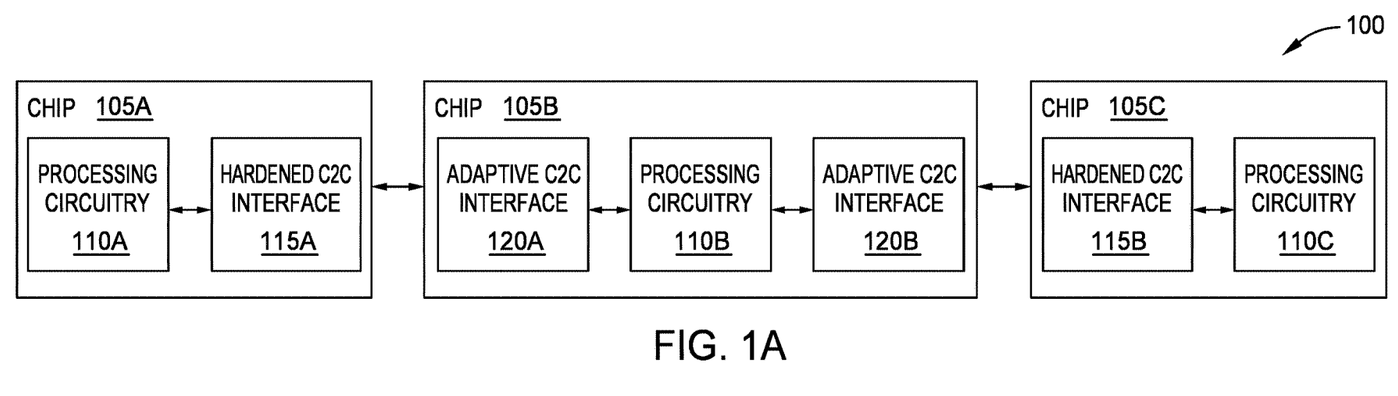
FIGS. 1A and 1B illustrate using adaptive C2C interfaces for communicating between chips, according to an example.
Figure 1B:
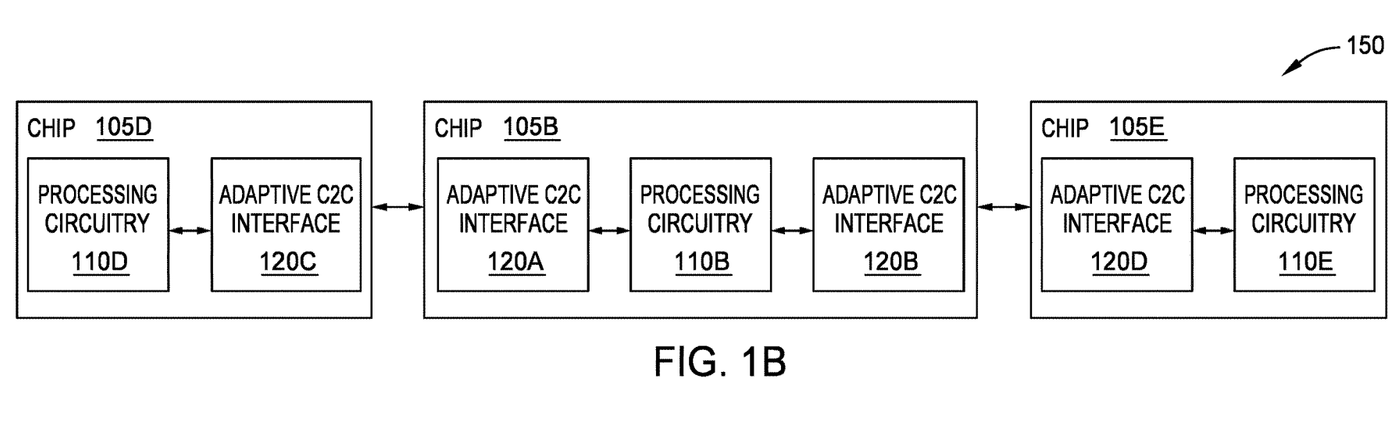

FIGS. 1A and 1B illustrate using adaptive C2C interfaces 120 for communicating between chips, according to an example. FIG. 1A illustrates a system 100 with chips 105A, B, and C. These chips 105 can be a mixture of heterogeneous chips or can be homogeneous chips. The chips 105 can include any kind of semiconductor chip or integrated circuit (IC) such as FPGAs, ASICs, SoCs, anchor dies, or chiplets (e.g., HBM).

Anchor and chiplet based designs enable use of templated architectures to produce large circuits from smaller, duplicated or identical chiplets. The chiplet is part of an overall IC design framework that performs one or more specific functions, but requires an external entity (i.e., the anchor) to render the functions useful. For example, a chiplet may perform acceleration of a machine learning function, but require the anchor to program its registers, provide interface to memory, etc. Conversely, the anchor is configured as a superset of a conventional IC, as certain functionality required for the IC design framework is not present but relegated to the chiplets interfaced with the anchor. Not only does the anchor perform most of functions of a conventional IC (for example, CPU, memory controller etc.), the anchor also has logic to interface with at least one chiplet. In some example, an anchor is able to interface with tens of chiplets.

One advantage of employing a chiplet/anchor architecture is that the architecture decouples development cycles of the anchor and the chiplet. For example, a developer of the anchor may develop and generate the anchor independent from development of the chiplet. Instead, the anchor and the chiplet merely employ the C2C interface that is defined clearly and consistently to enable communications between the anchor and coupled chiplet. This provides flexibility in creating a device IC based on the anchor and chiplets. Furthermore, the flexibility may be provided with different levels of granularity. For example, the flexibility may involve different chiplets in different arrangements, different mappings for communications between chiplets and the anchor, and the like.

In this embodiment, the chip 105B (e.g., an anchor) includes adaptive C2C interfaces 120A and 120B which are used to communicate with the chips 105A and 105C (e.g., chiplets), respectively. The adaptive C2C interfaces 120 support multiple different C2C protocols. Each adaptive C2C interface 120 can support multiple standard C2C protocols (e.g., AXIS and CXS), one standard C2C protocol and a proprietary C2C protocol, or multiple standard C2C protocols and a proprietary C2C protocol. At boot time, the adaptive C2C interfaces 120 are configured to execute or perform one of the multiple C2C protocols supported by the interfaces 120.

The chips 105A and 105C, in contrast, include hardened C2C interfaces 115A and 115B. The hardened C2C interfaces 115 can support or execute only one C2C protocol. For example, the hardened C2C interfaces 115A and 115B may execute the AXIS protocol. In that case, to enable communication between the chip 105B and the chips 105A and 105C, the adaptive C2C interfaces 120 are configured to also execute the AXIS protocol. Conversely, if the hardened C2C interfaces 115A and 115B instead execute a proprietary protocol, the adaptive C2C interfaces 120 are configured to also execute the proprietary protocol. Thus, so long as the hardened C2C interfaces 115 execute a C2C protocol that is one of the protocols supported by the adaptive C2C interfaces 120, then the chips 105A-C can communicate. In this manner, the adaptive C2C interfaces 120 can greatly increase the types of chips the chip 105B can communicate with such as chips from different product generations or made by different vendors.

The chips 105A-C also include respective processing circuitry 110 which can communicate with the processing circuitry 110 in a different chip using the hardened and adaptive C2C interfaces 115, 120. The processing circuitry 110 can be the same or different in the chips 105A-C. For example, the chip 105B may be an anchor chip while the chips 105A and 105C are chiplets that perform the same function (e.g., HBM). In another example, the chips 105A-C can each include different types of processing circuitry 110 (e.g., an anchor chip and two chiplets that perform different functions, or three anchor chips). As non-limiting examples, the processing circuitry 110 can include data processing engines, memory (e.g., HBMs), memory controllers, programmable logic, central processing units (CPUs), accelerators, and the like.

Although not shown, the connections between the chips 105 may extend through an interposer, which is discussed later.

FIG. 1B illustrates the same chip 105B from FIG. 1A that is connected to chips 105D and 105E, which both include adaptive C2C interfaces. That is, unlike in FIG. 1A where one chip having adaptive C2C interfaces 120 is connected to chips with hardened C2C interfaces 115, in FIG. 1B, the chips 105B, 105D, and 105E all contain adaptive C2C interfaces 120. The adaptive C2C interfaces 120A-D can support the same set of C2C protocols or may support different sets of C2C protocols. So long as the sets of C2C protocols supported by the adaptive C2C interfaces 120A-D have at least one common C2C protocol, then that common C2C protocol can be used to communicate between the chips 105B, 105D, and 105E. As such, C2C connections can be formed between chips with adaptive C2C interfaces 120 so long as the interfaces 120 support at least one common C2C protocol.

Like in FIG. 1A, the chips 105B, 105D, and 105E in FIG. 1B also include respective processing circuitry 110. The processing circuitry 110 can communicate with the processing circuitry 110 in a different chip using the adaptive C2C interfaces 120A-D. The processing circuitry 110 can be the same or different in the chips 105B, 105D, and 105E.

Figure 2:
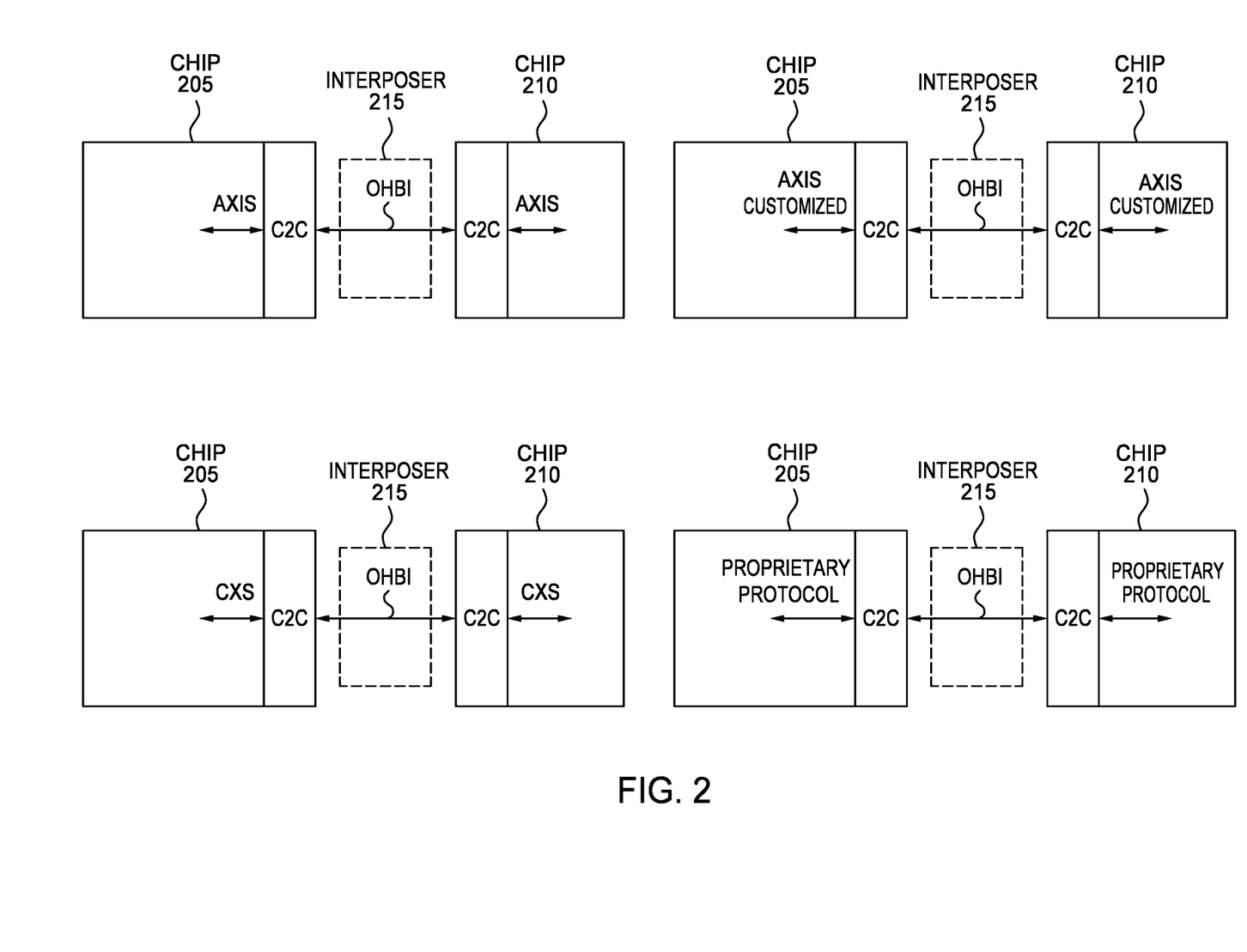
FIG. 2 illustrates different communication schemes that can be supported by adaptive C2C interfaces, according to an example.

FIG. 2 illustrates different communication schemes that can be supported by adaptive C2C interfaces, according to an example. Specifically, FIG. 2 illustrates four different schemes for forming C2C connections where at least one chip (but possibly both) has an adaptive C2C interface. Further, the chips 205, 210 are connected using an interposer 215 which provides electrical connections between the chips 205, 210. In one embodiment, the chips 205, 210 are disposed on a same surface of the interposer 215 (e.g., a silicon interposer), but in other embodiments may be disposed on different sides of the interposer 215 (e.g., opposite sides). Although two chips (e.g., integrated circuits (IC)) are shown, the interposer 215 could be used to connect more than two chips together (e.g., the three chips shown in FIGS. 1A and 1B) on the same surface or by using multiple surfaces on the interposer 215. Further, in all the examples shown in FIG. 2, the same bus protocol (e.g., Open High Bandwidth Interface (OHBI), Bunch of Wires (BoW), or Advanced Interface Bus (AIB)) can be used to route data through the interposer 215.

In one example, it is assumed that the chip 205 includes an adaptive C2C interface that can support AXIS, CXS, and a proprietary C2C protocol. In contrast, the chip 210 is assumed to include a hardened C2C interface. The upper left example illustrates that the chip 210 uses the AXIS protocol, in which case, the adaptive C2C interface (not shown) in the chip 205 has been configured to also use the AXIS protocol. The upper right example illustrates that the chip 210 uses a customized AXIS protocol, in which case, the adaptive C2C interface in the chip 205 has been configured to also use the customized AXIS protocol. The lower left example illustrates that the chip 210 uses the CXS protocol, in which case, the adaptive C2C interface in the chip 205 has been configured to also use the CXS protocol. The lower right example illustrates that the chip 210 uses a proprietary protocol, in which case, the adaptive C2C interface in the chip 205 has been configured to also use the proprietary protocol.

However, in another example, it is assumed the chips 205 and 210 both have adaptive C2C interfaces. If these interfaces have circuitry to support AXIS, customized AXIS, CXS, and proprietary protocols, then the four schemes shown in FIG. 2 are possible ways the chips 205 and 210 can be configured to communicate.

Figure 3:
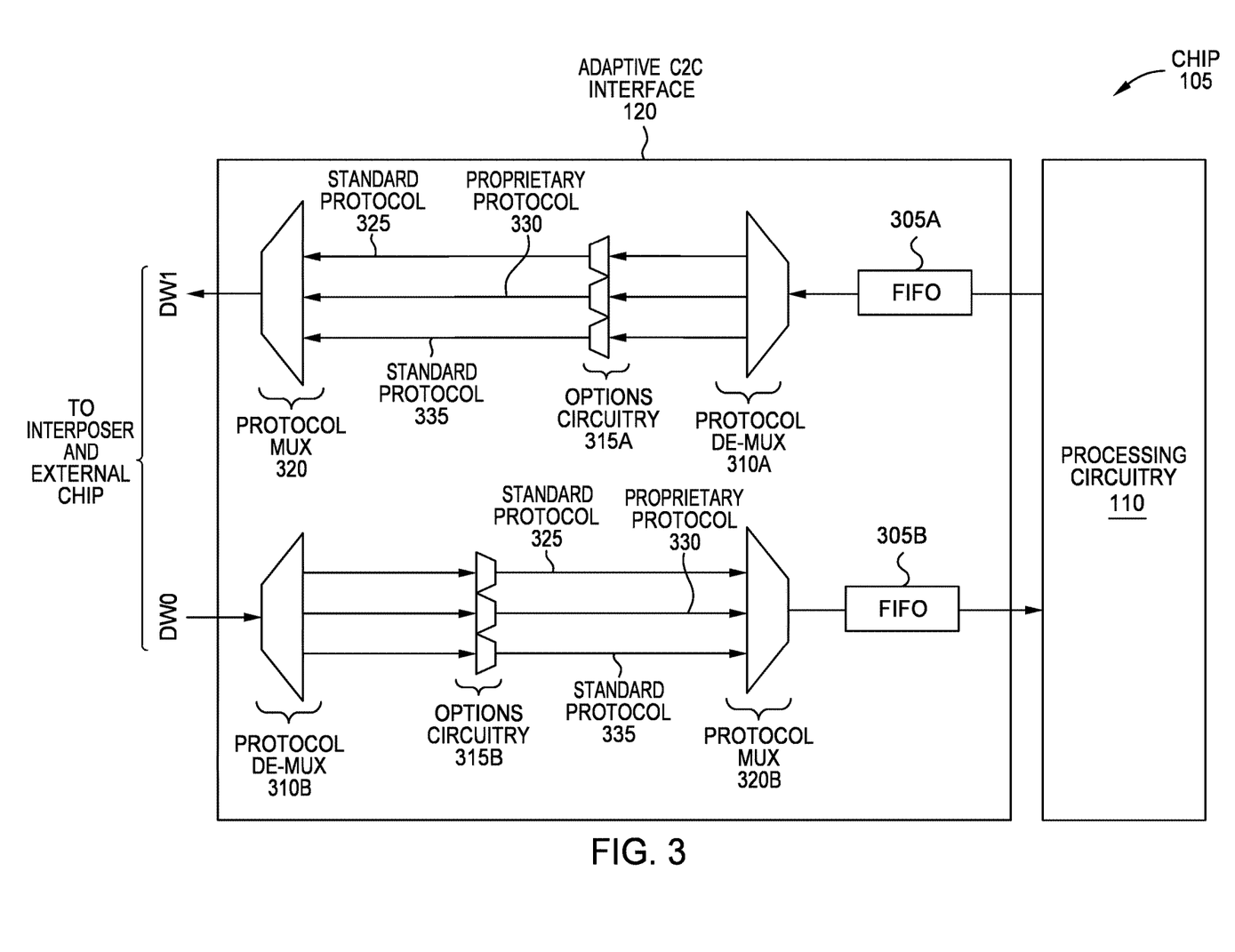
FIG. 3 illustrates circuitry in an adaptive C2C interface, according to an example.

FIG. 3 illustrates circuitry in an adaptive C2C interface 120, according to an example. In this example, the adaptive C2C interface 120 illustrates two data words (DW0 and DW1), but can have any number of DWs. DW1 is used to transmit data from the processing circuitry 110 in the chip 105 to the interposer and the external chip, while DW0 is used to receive data from the interposer and the external chip.

In this example, the adaptive C2C interface 120 supports three different types of C2C protocols: a first standard protocol 325 (e.g., AXIS or customized AXIS), a proprietary protocol 330, and a second standard protocol 335 (e.g., CXS or customized CXS). That is, the data paths for DW0 and DW1 (and any other DW channels in the interface 120) can support anyone of these three different C2C protocols. However, this is just one example. In other embodiments, the adaptive C2C interface 120 may support only the two standard protocols, or the interface 120 may support only one of the standard protocols and the proprietary protocol 330.

As shown, the DW1 data path stores data received from the processing circuitry 110 in a first in first out (FIFO) 305A which then forwards data to a protocol de-multiplexer (de-mux) 310A. The protocol de-mux 310A selects which C2C protocol is performed or used by the adaptive C2C interface 120 based on selection signals. These mux selection signals can be set by registers, which will be discussed below. In any case, the protocol de-mux 310A routes the data along a path that corresponds to the C2C protocol currently being performed by the adaptive C2C interface 120.

The adaptive C2C interface 120 also includes options circuitry 315A which permits the user to customize the standard protocols 325, 335 and the proprietary standard 330. For example, the user may want to use a customized AXIS or CXS protocol such as customized AXIS that uses different TKEEP bits, or customized CXS with different parity bits. The options circuitry 315A includes multiplexers and processing circuitry that enables the adaptive C2C interface 120 to support customized versions of the standard protocols 325, 335. Moreover, the options circuitry 315A can include circuitry for enabling the adaptive C2C interface 120 to use a proprietary standard 330. In one embodiment, unlike the standard protocols 325, 335, the proprietary standard 330 does not initially assign any meaning to the wires used in the C2C connection. Instead, the adaptive C2C interface 120 permits the user to assign the meaning of the wires at boot time. In this manner, using the data path corresponding to the proprietary standard enables the user to assign whatever meaning she wants the wires corresponding to the DW1 (e.g., a data word, timing word, identification word, parity word, etc.).

The data path for DW1 also includes a protocol mux 320A which outputs data received from whichever C2C protocol the adaptive C2C interface 120 is configured to perform. For example, if the adaptive C2C interface 120 is currently configured to perform the standard protocol 325, then the selection signals sent to the protocol mux 320A cause it to output the data received from the top data path. In this manner, the data transmitted to the interposer and the external chip using DW1 can be sent using one of the three C2C protocols supported by the adaptive C2C interface 120.

The data path for DW0 is similar, but reversed, relative to the data path for DW1. In this case, when a data word is received from the interposer, the protocol de-mux 310B routes the data on one of the three data paths corresponding to the three C2C protocols currently being performed by the adaptive C2C interface 120—e.g., the first standard protocol 325, the proprietary protocol 330, or the second standard protocol 335. The data bit then passes through the options circuitry 315B which supports the various customizations as discussed above. Finally, the data bit passes through the protocol mux 320B and is stored in the FIFO 305B before being sent to the processing circuitry 110.

In one embodiment, the data paths for the DWs used to transmit data to the interposer and external chip can use a different C2C protocol than the data paths for the DWs used to receive data. That is, the transmit and receive DWs are independent of each other. For example, the adaptive C2C interface 120 can use the first standard protocol 325 (e.g., AXIS) to transmit DWs to the interposer and the external chip but use the second standard protocol 335 (e.g., CXS) to receive DWs from the interposer and the external chip.

Further, the circuitry in the data paths corresponding to the C2C protocols that were not selected during boot time is then not used during runtime. For example, if the adaptive C2C interface 120 was configured at boot time to use the first standard protocol 325, the data paths corresponding to the proprietary protocol 330 and the second standard protocol 335 are unused during runtime. In one embodiment, for each DW, only one of the three data paths between the protocol mux 320 and the protocol de-mux 310 is used during runtime while the other two data paths are unused during runtime.

Figure 4:
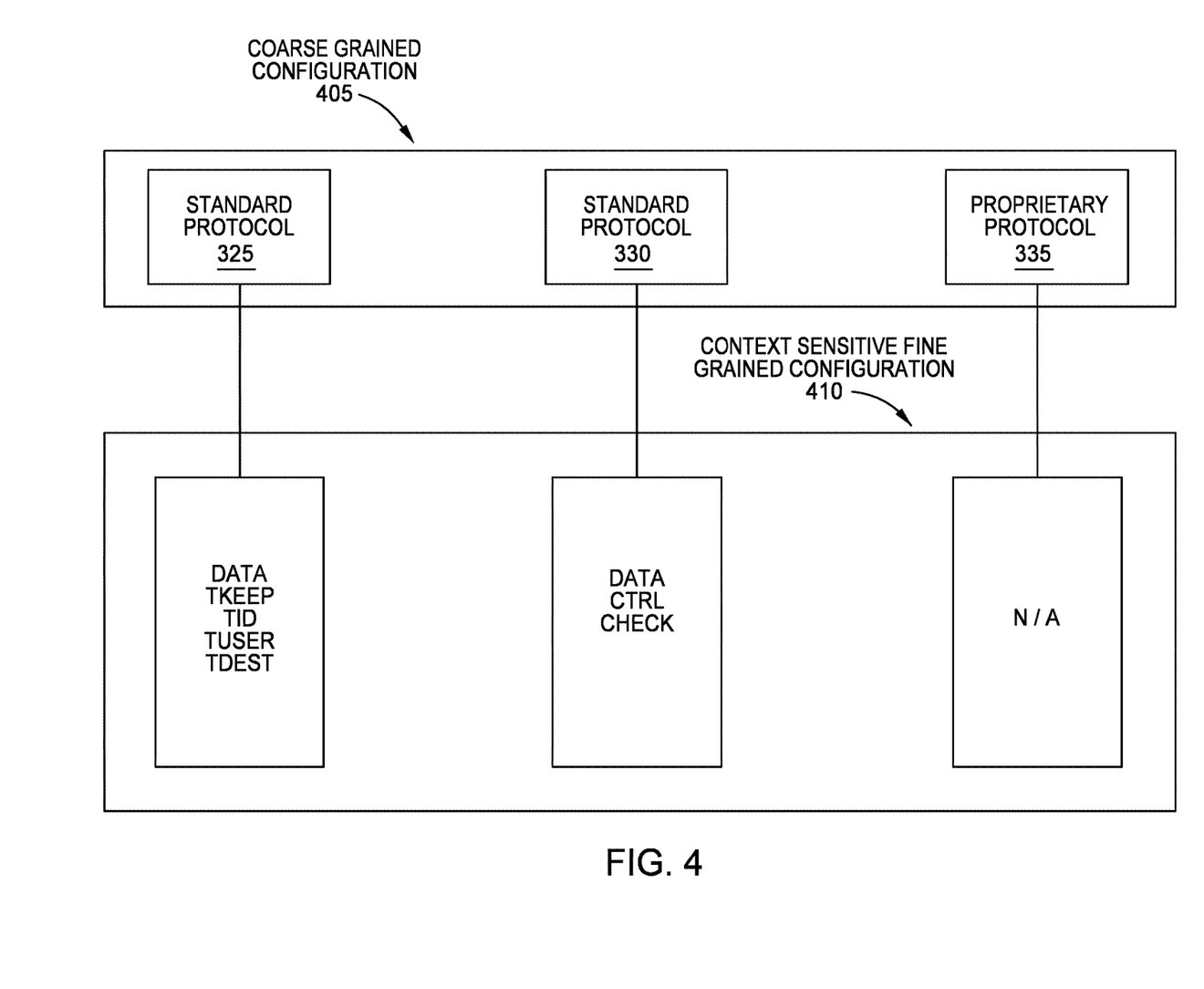
FIG. 4 illustrates coarse and fine grained configurations for an adaptive C2C interface, according to an example.

FIG. 4 illustrates coarse and fine grained configurations for an adaptive C2C interface, according to an example. In one embodiment, FIG. 4 illustrates a programmable model for programming an adaptive C2C interface during boot time. In this embodiment, the coarse grained configuration 405 sets the C2C protocol used by the particular adaptive C2C interface. Continuing the example in FIG. 3, the coarse grained configuration 405 sets three different C2C protocols: the first standard protocol 325, the second standard protocol 330, or a proprietary protocol 335. That is, during boot time, a user can set the coarse grained configuration 405 to select one of the three C2C protocols.

As mentioned above, the adaptive C2C interface can use different C2C protocols depending on the direction. Thus, the coarse grained configuration 405 may set a different C2C protocol for the DWs used to receive data than the DWs used to transmit data.

The fine grained configuration 410 can customize the selected C2C protocol. For example, if the first standard protocol 325 is AXIS, the fine grained configuration 410 can be used to set the DATA, TKEEP, TID, TUSER, and TDEST signals. As discussed in examples below, the number of bits used for these signals can vary, and thus, be customized using the fine grained configuration 410. In one embodiment, the fine grained configuration 410 is used to choose between different pre-set customizations of the first standard protocol 325. For example, the AXIS specification may define different customizations of AXIS. The fine grained configuration 410 can then be used to select between those different customizations.

If the second standard protocol 330 is selected, the fine grained configuration 410 can be used to customize the protocol 330. In this example, the second standard protocol 330 may be the CXS protocol where the fine grained configuration 410 can customize the DATA, CTRL, and CHECK signals. In one embodiment, the CXS specification may define different customizations of CXS. The fine grained configuration 410 can then be used to select between those different customizations.

In contrast, in this example, there are not any pre-set customizations or signals for the proprietary protocol 335. In that case, the wires in the C2C protocol are not assigned any meaning or value. Instead, the fine grained configuration 410 can provide the meaning or assignments to the wires in the C2C interface. That is, the user can completely customize or set the values of the wires in the C2C interface to support whatever proprietary protocol 335 is desired.

Figure 5:
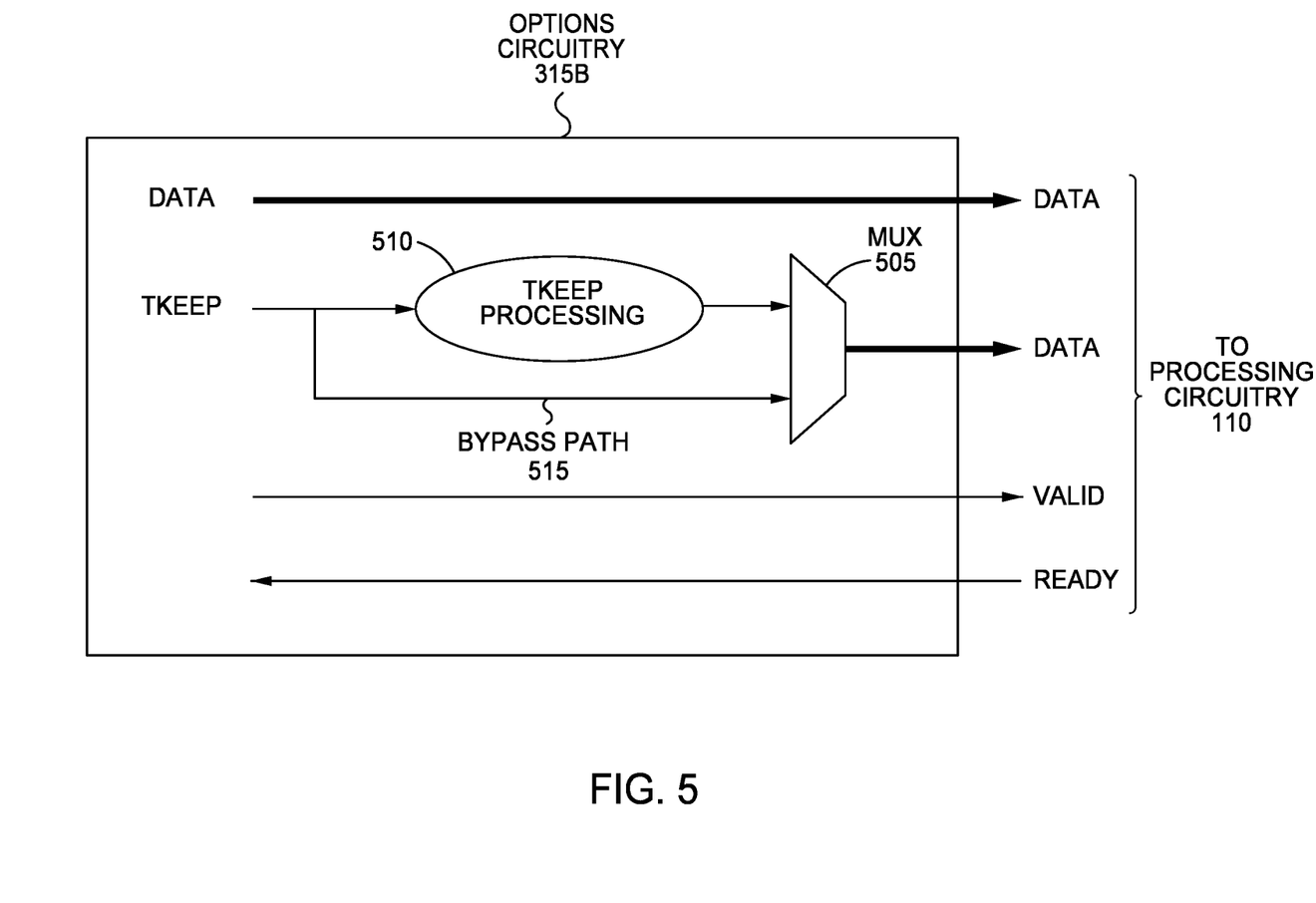
FIG. 5 illustrates options circuitry in an adaptive C2C interface, according to an example.

FIG. 5 illustrates options circuitry 315B in an adaptive C2C interface, according to an example. That is, FIG. 5 illustrates an exemplary implementation of the options circuitry 315B introduced in FIG. 3. In this example, the options circuitry 315B is used in a receive path where DATA signals and TKEEP signals are received from the interposer and external chip. The options circuitry 315 includes TKEEP processing circuitry 510 and a bypass path 515 which bypasses the TKEEP processing circuitry 510. For example, some customizations or implementations of AXIS perform TKEEP processing while other customizations or implementations do not. For the AXIS implementations or customizations that perform TKEEP processing in the adaptive C2C interface, the fine grained configuration can set a select signal on a mux 505 to output the input received from the TKEEP processing circuitry 510. However, if the fine grained configuration indicates the options circuitry 315A should not perform TKEEP processing, then the fine grained configuration sets the select signal on the mux 505 to output the input received from the bypass path 515.

In addition, the options circuitry 315B illustrates a VALID signal that can be received from the interposer and the external chip. The options circuitry 315B also illustrates a READY signal that can be transmitted to the interposer and the external chip.

Figure 6:
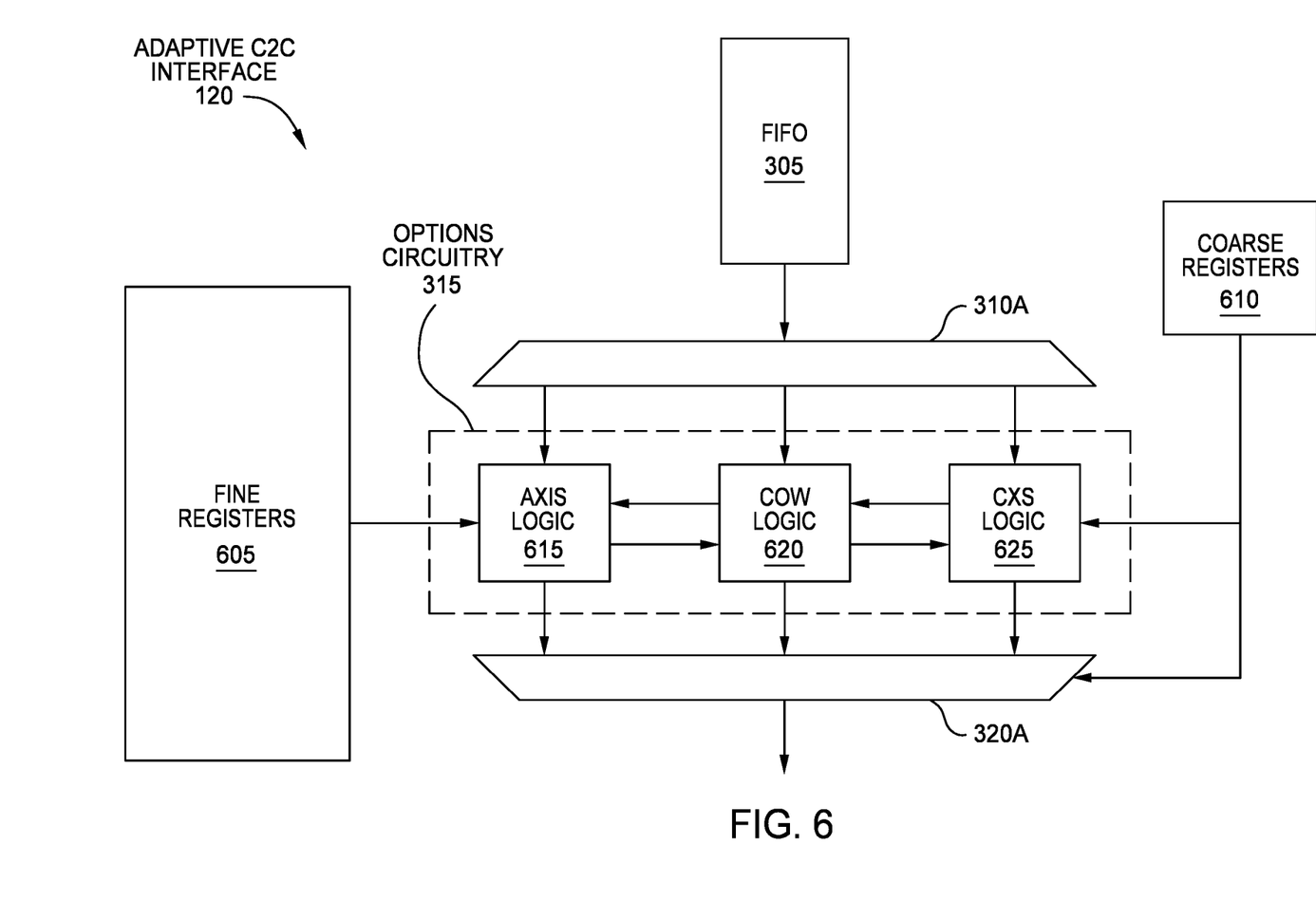
FIG. 6 illustrates circuitry in an adaptive C2C interface, according to an example.

FIG. 6 illustrates circuitry in an adaptive C2C interface 120, according to an example. In this example, the adaptive C2C interface 120 includes coarse registers 610 that store the coarse grain configuration discussed above. That is, the coarse registers 610 store the information corresponding to the coarse grain configuration, such as which of the C2C protocols the adaptive C2C interface 120 is configured to use. As such, the coarse registers 610 output control signals to the mux 310A, the mux 320A, and the options circuitry 315. These control signals can control the outputs of the muxes 310A and 320A so the data is routed on the data path corresponding to the selected C2C protocol. In this example, the adaptive C2C interface 120 can support AXIS, CXS, and a proprietary protocol.

The options circuitry 315 includes AXIS logic 615, Collection of Wires (COW) logic 620, and CXS logic 625. The AXIS and CXS logic 615, 625 is used when either the AXIS or CXS protocol is selected by the coarse registers 610. The COW logic 620 is used when the proprietary protocol is selected by the coarse registers 610. In one embodiment, the COW logic 620 does not assign meaning to the wires in the C2C interface, and instead, the meaning is provided by the user in order to perform the proprietary protocol.

The adaptive C2C interface 120 also includes fine registers 605 that store the fine grain configuration discussed above. The fine registers 605 output control signals to the AXIS logic 615, COW logic 620, and the CXS logic 625. These control signals permit the adaptive C2C interface 120 to implement customizations of the AXIS and CXS protocols, and implement a proprietary protocol by assigning meaning to the COWs in the C2C interface. Thus, in this example, the options circuitry 315 contains separate logic or circuitry for the three C2C protocols supported by the adaptive C2C interface 120. In one embodiment, the control signals from the coarse registers 610 indicate which of the three logics 615, 620, and 625 are active while the control signals from the fine registers 605 set the customizations for that logic (if any).

Thus, FIG. 6 illustrates using coarse registers 610 and fine registers 605 to implement the coarse and fine grained configurations discussed in FIG. 4. Further, FIG. 6 illustrates one example of a multi-level static-multiplexing mechanism controlled by configuration registers (e.g., the fine and coarse registers 605, 610). There are three main aspects to the multiplexing in FIG. 6: de-multiplexing the incoming DW to one of the three protocols using the mux 310A, multiplexing across various streaming protocols using the mux 320A, and multiplexing options within a streaming protocol using the axis logic 615, COW logic 620, and the CXS logic 625 in the options circuitry 315.

In this embodiment, advantageously, protocol specific resources such as the FIFO 305 are not replicated across different protocols. With the multi-level multiplexing scheme, the adaptive C2C interface can use a single resource (such as a single FIFO 305) at the output of options multiplexing, thus reducing the gate-count of the design.

In one embodiment, to reduce the amount of multiplexing, a limited range of programming may be enforced. For example, certain chips may permit their adaptive C2C interfaces to support only coarse-level register programming, while other chips may permit their adaptive C2C interfaces to support only two options for fine-level register programming.

Figure 7:
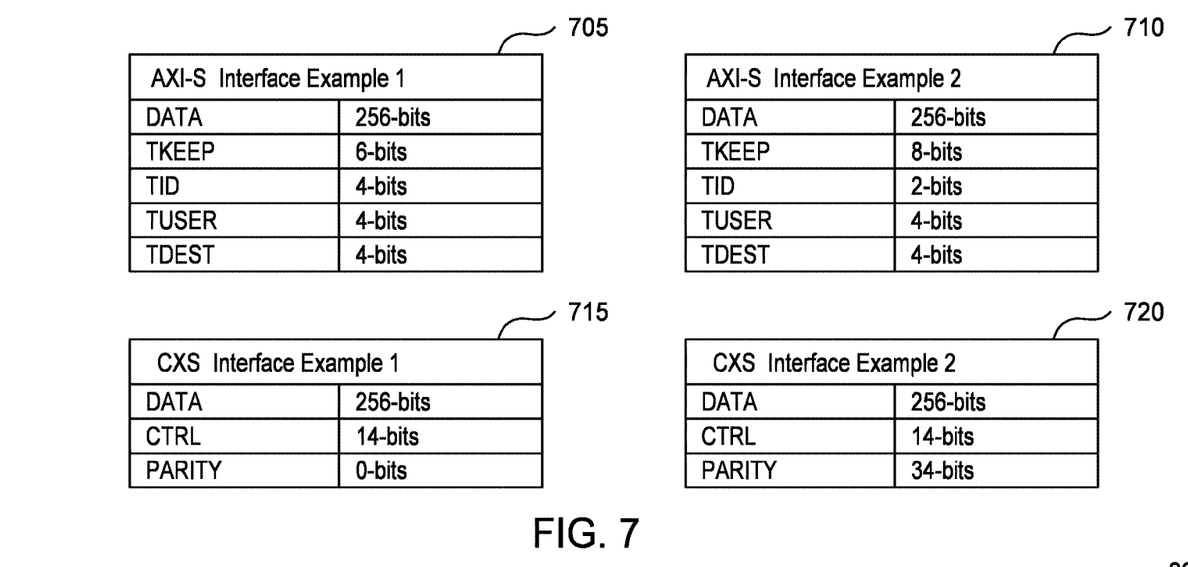
FIG. 7 includes tables of C2C protocols that can be supported by an adaptive C2C interface, according to an example.

FIG. 7 illustrates tables of C2C protocols that can be supported by an adaptive C2C interface, according to an example. Table 705 illustrates a first customization or implementation of AXIS using the adaptive C2C interface 120, while table 710 illustrates a second customization or implementation of AXIS using the same adaptive C2C interface 120. That is, the tables 705 illustrate that the same adaptive C2C interface 120 can be configured, at boot time, to implement different customizations of AXIS.

The AXIS implementations shown in the Tables 705 and 710 both assign 256 bits as DATA signals, 4 bits as TUSER signals, 4 bits as TDEST signals. However, the AXIS implementations differ in that the implementation in Table 705 uses only 6 bits for the TKEEP signal while the implementation shown in Table 710 uses 4 bits. Moreover, the implementation in Table 710 uses only 2 bits for the TID signal while the implementation shown in Table 705 uses 4 bits. These different customizations of the AXIS protocol can be enabled using the fine grain configuration stored in the fine registers 605 in FIG. 6.

FIG. 7 also includes Table 715 which illustrates a first customization or implementation of CXS using the adaptive C2C interface 120, while table 720 illustrates a second customization or implementation of CXS using the same adaptive C2C interface 120. The CXS implementations shown in the Tables 715 and 720 both assign 256 bits as DATA signals and 14 bits as control (CTRL) signals. However, the CXS implementations differ in that the implementation in Table 715 does not use parity while the implementation shown in Table 720 assigns 34 bits as PARITY signals. These different customizations of the CXS protocol can be enabled using the fine grain configuration stored in the fine registers 605 in FIG. 6.

As another example customization that can be performed, the adaptive C2C interface can be configured to support different flow control mechanism for the selected C2C protocol. For example, the adaptive C2C interface can use a valid/ready flow control mechanism for the selected C2C protocol or a credit based flow control mechanism.

Figure 8:
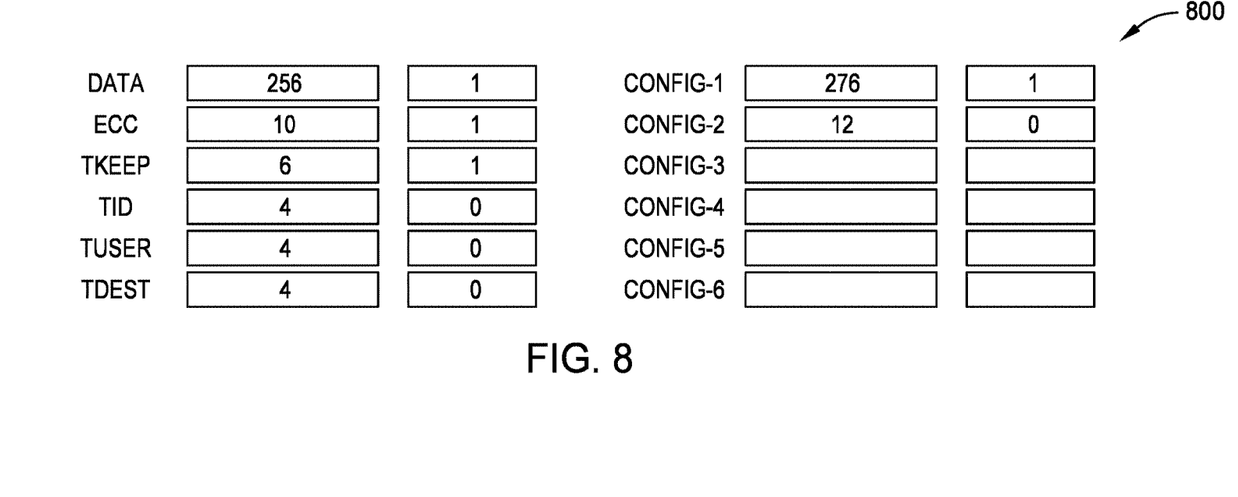
FIG. 8 illustrates control signals for merging bits in received data words, according to an example.

FIG. 8 illustrates control signals for merging bits in received data words, according to an example. If two DWs are received in the same direction, some of the fields in the DWs can be merged. The table 800 illustrates fields in a DW for AXIS that can be merged with another DW received in the same direction. In this example, a "1" in the second column indicates that the fields should be merged while a "0" indicates the fields in the two DWs do not have to be merged. For example, the 256 bits of the DATA signals in the two DWs should be merged to form 512 bits of DATA signals. Similarly, the bits of the ECC, TKEEP, and CONFIG-1 signals can also be merged into one respective field.

In contrast, the TID, TUSER, TDEST, and the CONFIG-2 signals do not have to be merged. Instead, the adaptive C2C interface can select one of the fields to propagate or carry forward while the corresponding field is dropped or ignored. For example, for the fields that are not merged, the adaptive C2C can select the field from the lower DW to carry forward while the corresponding field(s) in the higher DW is dropped.

In one embodiment, when merging DWs received in the same direction when the adaptive C2C interface is implementing a proprietary C2C protocol, 276 bits of data in the two DWs are merged while the control bits are not. That is, the adaptive C2C interface can ignore the control bits from one of the two DWs.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) die, comprising:
   an adaptive chip-to-chip (C2C) interface comprising a mux and a de-mux for supporting a plurality of different C2C protocols to communicate with an external IC die using a C2C connection, wherein each of the plurality of different C2C protocols corresponds to a different data path of a plurality of data paths and wherein, during boot time, the adaptive C2C interface is configured to perform only one of the plurality of different C2C protocols that is in common with the external IC die to communicate with the external IC die; and
   processing circuitry coupled to the adaptive C2C interface and configured, during runtime, to use the adaptive C2C interface to communicate with the external IC die, wherein the IC die and the external IC die are components of a chip-to-chip configuration.

2. The IC die of claim 1, wherein the plurality of different C2C protocols are streaming C2C protocols.

3. The IC die of claim 1, wherein
   the de-mux comprises outputs coupled to the data paths corresponding to the plurality of different C2C protocols, wherein the de-mux is configured to select only one of the data paths as an output during runtime; and
   the mux coupled to the data paths as inputs and configured to and select between one of the data paths to output to one of the external IC die or the processing circuitry.

4. The IC die of claim 1, wherein the adaptive C2C interface is configured to receive a first data word (DW) from the external IC die and transmit a second DW to the external IC die,
   wherein the adaptive C2C interface is configurable, at boot time, to use a first one of the plurality of different C2C protocols to receive the first DW and use a second, different one of plurality of different C2C protocols to transmit the second DW.

5. The IC die of claim 1, further comprising:
   a second adaptive C2C interface disposed on a different side of the IC die than the adaptive C2C interface, wherein the second adaptive C2C interface comprising circuitry for supporting the plurality of different C2C protocols, wherein the IC die is configured to, during boot time, configure the second adaptive C2C interface to perform only one of the plurality of different C2C protocols to communicate with a second external IC die.

6. The IC die of claim 1, wherein the circuitry in the adaptive C2C interface corresponding to one of the plurality of different C2C protocols that was not selected during boot time is not used during runtime, wherein the IC die is one of an anchor or a chiplet in the chip-to-chip configuration.

7. The IC die of claim 2, wherein a first streaming C2C protocol of the streaming C2C protocols is a standard-defined protocol and a second streaming C2C protocol of the streaming C2C protocols is a proprietary protocol.

8. The IC die of claim 3, wherein the adaptive C2C interface further comprises:
   options circuitry disposed along the data paths and between the de-mux and the mux, wherein the options circuitry permits the adaptive C2C interface to customize the plurality of different C2C protocols.

9. The IC die of claim 8, wherein the adaptive C2C interface further comprises:
coarse registers for storing coarse grain configuration for controlling the de-mux and the mux to select only one of the data paths; and
fine registers for storing fine grain configuration for controlling the options circuitry to customize the one of the plurality of different C2C protocols.

10. A system, comprising:
a first IC die comprising a hardened C2C interface comprising circuitry for supporting only a first C2C protocol; and
a second IC die connected to the first IC die, wherein one of the first and second IC dies is an anchor and the other is a chiplet, wherein the second IC die comprising an adaptive C2C interface comprising a mux and a de-mux for supporting a plurality of different C2C protocols, wherein each of the plurality of different C2C protocols corresponds to a different data path of a plurality of data paths and wherein the second IC die is configured to, during boot time, configure the adaptive C2C interface to perform only the first C2C protocol to communicate with the hardened C2C interface in the first IC die.

11. The system of claim 10, further comprising:
an interposer, wherein the hardened C2C interface and the adaptive C2C interface communicate with each other via the interposer.

12. The system of claim 10, wherein the plurality of different C2C protocols are streaming C2C protocols.

13. The system of claim 10, wherein
the de-mux comprises outputs coupled to the data paths corresponding to the plurality of different C2C protocols, wherein the de-mux is configured to select only one of the data paths as an output during runtime; and
the mux coupled to the data paths as inputs and configured to and select between one of the data paths to output to the first IC die.

14. The system of claim 11, further comprising:
a third IC die connected to the interposer and comprising a second hardened C2C interface comprising circuitry for supporting only the first C2C protocol,
wherein the second IC die comprises a second adaptive C2C interface comprising circuitry for supporting the plurality of different C2C protocols, wherein the first IC die is configured to, during boot time, configure the second adaptive C2C interface to perform only the first C2C protocol to communicate with the second hardened C2C interface in the third IC die via the interposer.

15. The system of claim 12, wherein a first streaming C2C protocol of the streaming C2C protocols is a standard-defined protocol and a second streaming C2C protocol of the streaming C2C protocols is a proprietary protocol.

16. The system of claim 13, wherein the adaptive C2C interface further comprises:
options circuitry disposed along the data paths and between the de-mux and the mux, wherein the options circuitry permits the adaptive C2C interface to customize the plurality of different C2C protocols.

17. A system, comprising:
a chiplet comprising a first adaptive C2C interface comprising circuitry for supporting a plurality of different C2C protocols, wherein the chiplet is configured to, during boot time, configure the first adaptive C2C interface to perform only a first C2C protocol of the plurality of different C2C protocols; and
an anchor connected to the chiplet, the anchor comprising a second adaptive C2C interface comprising a mux and a de-mux for supporting the plurality of different C2C protocols, wherein each of the plurality of different C2C protocols corresponds to a different data path of a plurality of data paths and wherein the anchor is configured to, during boot time, configure the first adaptive C2C interface to perform only the first C2C protocol to communicate with the first adaptive C2C interface in the chiplet.

18. The system of claim 17, further comprising:
an interposer, wherein the first and second adaptive C2C interfaces communicate with each other via the interposer.

19. The system of claim 17, wherein the plurality of different C2C protocols are streaming C2C protocols.

20. The system of claim 18, further comprising:
a second chiplet connected to the interposer and comprising a third adaptive C2C interface,
wherein the anchor comprises a fourth adaptive C2C interface configured to communicate with the third adaptive C2C interface in the second chiplet via the interposer.

* * * * *